United States Patent [19]
Tolar et al.

[11] 3,969,197

[45] July 13, 1976

[54] METHOD FOR FABRICATING A THIN FILM CAPACITOR

[75] Inventors: Neal Jay Tolar; Robert Curlee Hooper, both of Plano; Prabhakar Bhimrao Ghate, Dallas; Clyde Rhea Fuller, Plano, all of Tex.

[73] Assignee: Texas Instruments Incorporated, Dallas, Tex.

[22] Filed: Feb. 8, 1974

[21] Appl. No.: 440,878

[52] U.S. Cl. .............................. 204/15; 29/25.42; 204/192; 317/258
[51] Int. Cl.[2] ...................... C25D 5/02; C25D 5/12
[58] Field of Search ............ 204/192, 15; 317/258; 29/25.42

[56] References Cited
UNITED STATES PATENTS

| | | | |
|---|---|---|---|
| 3,179,862 | 4/1965 | Dubilier | 317/258 |
| 3,257,305 | 6/1966 | Varga | 204/192 |
| 3,350,222 | 10/1967 | Ames et al. | 204/192 |
| 3,568,014 | 3/1971 | Schuermeyer | 317/258 |
| 3,607,679 | 9/1971 | Melroy | 204/192 |
| 3,869,367 | 3/1975 | Sato | 204/192 |

Primary Examiner—T. M. Tufariello
Attorney, Agent, or Firm—Harold Levine; James T. Comfort; Gary C. Honeycutt

[57] ABSTRACT

A process has been developed for fabricating a nonpolar low loss thin film capacitor utilizing tantalum oxide for high capacitance per unit area as a dielectric which is deposited in film form relative to a suitable substrate. A counter electrode is deposited on a substrate. A film of metal having a high recrystallization temperature is deposited on the counter electrode. This deposition forms the bottom electrode of the capacitor structure. The metal film has a quality thermal expansion resistance and a high reliability in thermal environments.

19 Claims, 3 Drawing Figures

METHOD FOR FABRICATING A THIN FILM CAPACITOR

FIELD OF THE INVENTION

This invention relates generally to thin film capacitors, such as are utilized in microwave design and more specifically is directed to a low loss thin film capacitor structure and to a method for fabricating the same. The capacitor structure fabricated in accordance with this invention is of nonpolar characteristics, is not sensitive to elevated temperatures and has exceptional reliability.

BACKGROUND OF THE INVENTION

In microwave design and in other fields of electronic engineering, thin film capacitors have been utilized for quite some time. There are three major problems, however, that frequently confront microwave design engineers in the use of thin film capacitors. Thin film capacitors generally have a polar characteristic that is typically manifested by eratic and inefficient capacitor operation and by unequal breakdown voltage, depending upon the direction of capacitor bias.

The other problems most frequently encountered in thin film capacitor design are sensitivity of the capacitor structures to elevated temperature and questionable reliability history. Thin film capacitors are sensitive to elevated temperatures because the various constituents from which the capacitors are composed typically have materially different coefficients of thermal expansion. For example, where aluminium is utilized as one of the film electrode layers of a thin film capacitor structure, the various structural layers of the capacitor will be stressed substantially at elevated temperatures because of the thermal mismatch between the aluminum and the other components of the capacitor. Thermal mismatch will cause stressing of the films and therefore can cause the leakage currents of the capacitor to be grossly increased an in some cases fracturing or distortion of the dielectric layer will cause the capacitors to become shorted. Linear expansion of the aluminum film is typically substantially greater than the linear expansion of a dielectric film to which the aluminum film may be adhered and, therefore, distortion or disruption of the dielectric film may occur as the capacitor is heated either during normal circuit operation or during assembly operations.

Questionable reliability of thin film capacitors results from stressing of the dielectric that results from mismatch of the linear thermal expansion coefficient. Other matters affecting reliability of thin film capacitors include the effect of moisture on the capacitor structures and the effect of heat including heat of circuit operation and the heat that is generated during assembly of the circuits to other components.

A currently available thin film capacitor structure in common usage utilizes anodized tantalum oxide ($Ta_2O_5$) as the dielectric film under which a film of aluminum is utilized to minimize the series resistance of the device. The series resistance of a capacitor is particularly important for signal bypassing at microwave frequencies.

Utilization of a thin aluminum film over which anodized tantalum oxide is deposited (a thin film capacitor structure that is typical) can cause serious problems from the standpoint of heat. Two factors are detrimental to aluminum-tantalum oxide thin film capacitors at elevated temperatures, such as temperatures in the range of 200° C. Aluminum has a substantially different linear coefficient of thermal expansion as compared to other thin film layers in a thin film capacitor structure. For example, the linear coefficient of thermal expansion of aluminum is $\alpha A1 = 20 \times 10^{-6}/°C$. while the linear coefficient of thermal expansion for other layers of typical capacitor structures may be defined as $\alpha \leq 12 \times 10^{-6}/°C$. It is obvious that a thermal mismatch occurs when two thin film layers of radically different coefficients of linear thermal expansion are adhered to one another. As is typically the case, the dielectric film interposed between two films of aluminum or in contact with an underlying aluminum foil will be substantially overstressed and distorted at elevated temperatures. When this occurs, the capacitor may become shorted if the thin dielectric film ruptures or the capacitor may be subject to erratic operation resulting from overstressing of the dielectric material.

Aluminum, the metal most often employed to form deposited electrode layers in thin film capacitors, has a low temperature of recrystallization. Recrystallization is observed in thin aluminum films at temperatures as low as 170° C. Thus, above 170° C. recrystallization would tend to take place. The distortion of the aluminum film that occurs during recrystallization would be aided by the stress that is induced by linear thermal expansion of the aluminum during heating and cooling thereof. While 170° C. is rarely an operational temperature, such temperature is often reached during circuit fabrication and during assembly of various circuits. Recrystallization of aluminum causes great changes in the topology of the bottom electrode of thin film capacitors. The movement in the aluminum film strains and disrupts the relatively thin dielectric film and causes changes in the relationship of the dielectric film to the aluminum films laminated thereto that result in either grossly increased leakage currents or result in actually shorting the capacitors.

Investigations have determined that no high conductivity metal other than aluminum is known to be useful beneath anodized tantalum thin film capacitors. This is caused by the anodization process, because aluminum is the only high conductivity metal that is itself anodizable. Other metals having characteristics of high conductivity would be completely etched away or would cause the anodization process to be short circuited. This situation arises because the tantalum film is of such a thickness that pinholes are always present, and because some mixing of the tantalum and the underlay material occurs during deposition of the tantalum regardless of the manner by which the tantalum is deposited.

There are three significant approaches that may be taken in order to eliminate the problem caused by the aluminum underlay. It may be found desirable to eliminate the aluminum underlay and utilize only the conductivity provided by the thin film capacitors with a series resistance less than a few ohms. If the aluminum underlay is eliminated, the electrical performance of the thin film capacitor must be sacrificed for purposes of reliability. The resulting thin film capacitors would be quite reliable but the series resistance factors of such capacitors would be less than desirable.

A second alternative might be to employ some modified form of pure aluminum for an underlay material. Alloying other elements in very small percentages with the aluminum would provide some significant assistance by raising the recrystallization temperature of solid solution. Alloying would also increase the resistivity of the film, but it would still remain much more conductive than a thin film of tantalum. The elevated temperature thermal mismatch and consequent stress would still be present in such a structure, since alloying the aluminum would change its linear coefficient of expansion by only an insignificant degree. Thus, this approach could be utilized to increase reliability of thin film capacitors, but the change in high temperature reliability would be only moderate, thereby resulting in the production of capacitors that still present problems of reliability from the standpoint of temperature. If, during manufacture of electronic components, the temperature of such a capacitor is raised above the recrystallization temperature of the alloy, it is possible for the topology of the bottom electrode to be substantially changed, which obviously would result in significant changes in the operational capability of the capacitor structure.

A third possible approach to the problems caused by aluminum underlay is to abandon the use of anodized tantalum. If the dielectric layer is formed by a method other than anodization, then nearly any metal may be chosen for the bottom electrode. It is necessary, however, that the metal film underlays be highly conductive and, until the present time, no significant advance has been made in the utilization of metals other than high conductive metals for forming the electrodes of a thin film capacitor structure. It has not been considered practical to utilize a thin film deposit of a metal having rather poor conductive qualities because of the necessity for the series resistance of the capacitor to be low for radio frequency by-passing at microwave frequencies. Accordingly, it is a primary object of the present invention to provide a method of fabricating thin film capacitor structures by employment of a novel assembly of capacitor elements that does not include anodized tantalum.

It is further an object of the present invention to provide a novel process for fabrication of thin film capacitors wherein the thin film metal layer, the dielectric layer and substrate all have substantially the same coefficient of thermal expansion.

It is an even further object of the present invention to provide a novel method of fabricating thin film capacitors utilizing a connector overlay that enables such capacitors to be utilized as a component of a thin film circuit or in the alternative may be ultilized in beam lead assembly as part of a hybrid circuit.

Among the several objects of the present invention is noted the contemplation of a novel process for fabricating a thin film capacitor wherein a rather poor conductive material may be utilized for its high temperature of recrystallization without sacrificing the series resistance qualities that are necessary for signal bypassing at microwave frequencies.

It is also an important feature of the present invention to provide a novel method of fabricating a thin film capacitor structure that utilizes a counter electrode formed of molybdenum or tungsten, having a metal film deposited thereon which film may be of rather poor conductive characteristics, molybdenum and tungsten cooperating with the metal film to reduce resistive losses on either side of the dielectric material of the capacitor and preventing the operating frequency of the capacitor from being reduced.

Another object of the present invention notes contemplation of a novel thin film capacitor structure incorporating deposited metal films composed of a metal having a very high temperature or recrystallization thereby preventing changes in the topology of the electrodes of the capacitor by heat during circuit operation or during circuit assembly procedures.

It is another important object of the present invention to provide a novel method of fabricating thin film capacitors wherein all of the various laminar thin film layers of the capacitor are compatible from the standpoint of the linear coefficient of thermal expansion thereof.

The present invention also contemplates the provision of a novel thin film capacitor structure that may be fabricated according to the method set forth herein.

Also contemplated by the present invention is a novel thin film capacitor structure and method of fabricating the same which yields commercially producible thin film capacitors that are simple in nature, reliable in use and low in cost.

Other and further objects, advantages and features of the present invention will become apparent to one skilled in the art upon consideration of the present invention. The form of the invention, which will now be described in detail, illustrates, the general principles of the invention, but it is to be understood that this detailed description is not to be taken as limiting the scope of the present invention.

SUMMARY OF THE INVENTION

After a substrate has been selected having desirable characteristics of thermal expansion, such as oxidized high $\rho$ silicon or fused silica with an adequate surface finish for thin film application, a film of molybdenum or tungsten is deposited by sputtering, evaporation or by chemical vapor deposition onto the finished surface of the substrate. The molybdenum or tungsten film is then patterned by conventional photo-engraving and etching to prepare it for a thin metal film of chromium which is then deposited and patterned in a similar manner. After patterning of the film of chromium, a dielectric film of tantalum oxide will be deposited to a desired thickness by sputtering or chemical vapor deposition and the tantalum oxide film will be selectively removed by gas plasma vapor etching, or by other suitable means, to provide a path through the tantalum film for electrical contact between the chromium film electrode and another electrode film.

A top electrode, defined by a thin chromium film may then be deposited onto the tantalum oxide dielectric film and, if desired, an intermediate layer of molybdenum, tungsten or an alloy of titanium and tungsten may be deposited over the chromium film to serve as a barrier between the chromium and a gold film that is deposited over the chromium film. The intermediate layer would, if desirable, serve as a barrier to provide the gold film with resistivity stability if such is desirable. The gold film is provided for the purpose of establishing electrical connection between the capacitor structure and other circuit structure, thereby allowing the capacitor to be employed as a component of a thin film circuit or allowing capacitors to be processed in beam lead form for external attachment as a component of a hybrid circuit.

By employing stable and durable materials in the manufacture of laminar thin film capacitors such as particularly desirable substrates, and including films of chromium, tantalum oxide and gold, a capacitor structure is yielded that is extremely durable. The capacitor includes thermally matched materials that will not cause film stresses at elevated temperatures and will effectively prevent changes in electrode topology by recrystallization of the metal films at temperatures encountered during normal circuit operation or during typical circuit fabrication.

BRIEF DESCRIPTION OF THE DRAWINGS

So that the manner in which the above recited features, advantages and objects of the present invention, as well as others, which will become apparent, are attained and can be understood in detail, one particular description of the invention, briefly summarized above, may be had by reference to the embodiments thereof which are illustrated in the appended drawings, which drawings form a part of this specification.

It is to be noted however that the appended drawings illustrate only typical embodiments of the invention and are therefore not to be considered limiting of its scope, for the invention may admit to other equally effective embodiments.

DESCRIPTION OF THE DRAWINGS

Figure 1:
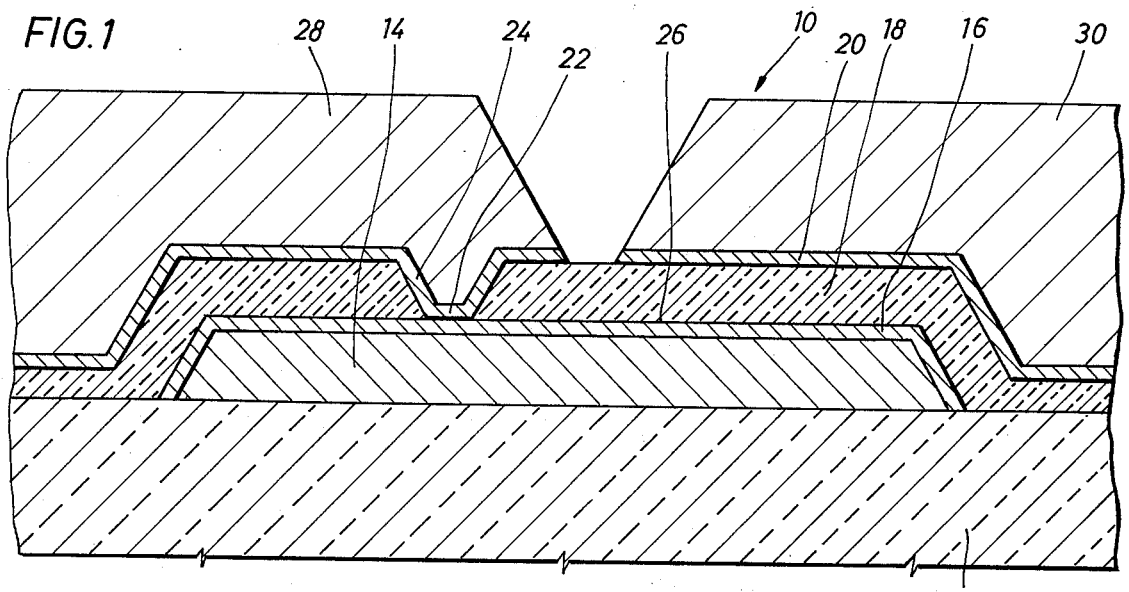

FIG. 1 is a sectional view of a thin film capacitor structure fabricated in accordance with the present invention.

Figure 2:
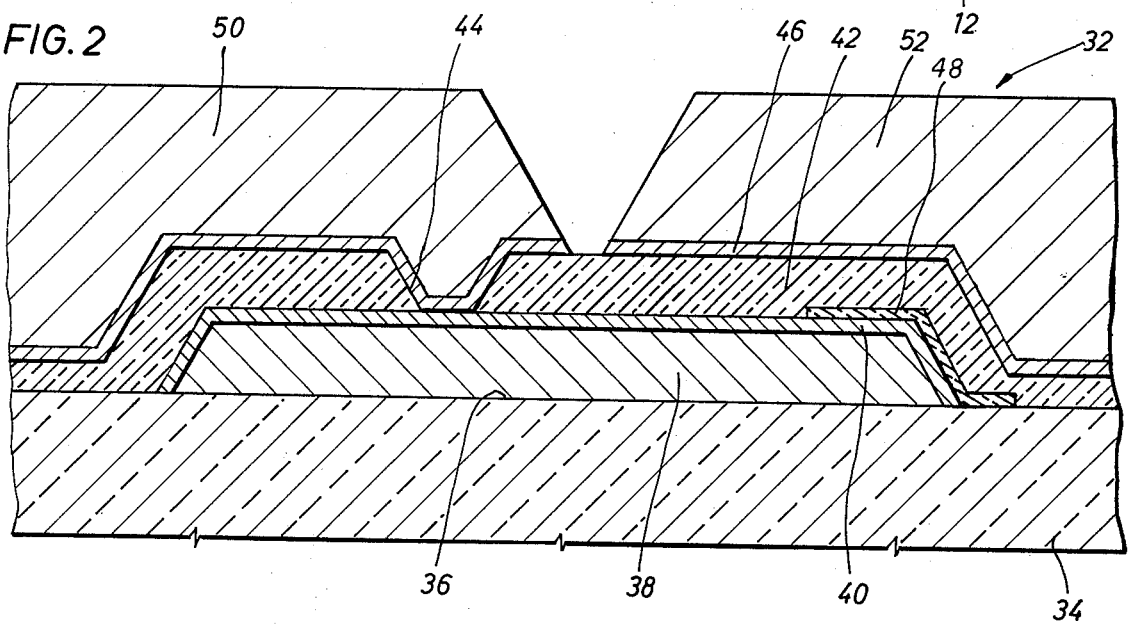

FIG. 2 is a sectional view of a thin film capacitor structure representing a modified embodiment of the present invention.

Figure 3:
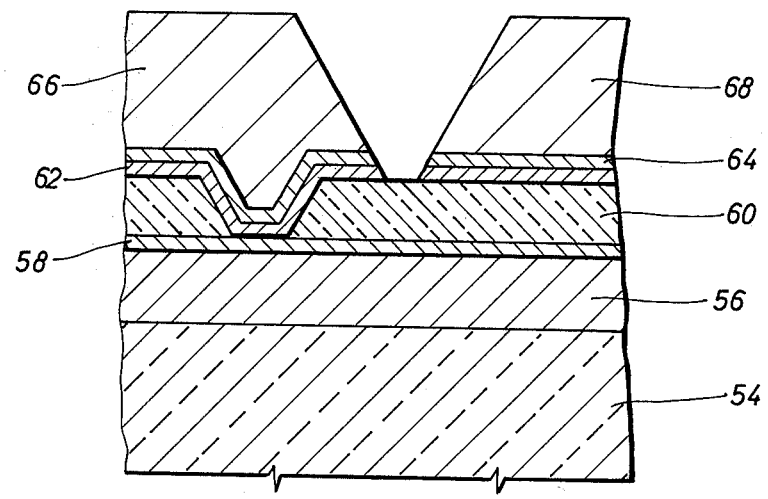

FIG. 3 is a sectional view of a thin film capacitor structure representing a further modified embodiment of the present invention.

DESCRIPTION OF PREFERRED EMBODIMENTS

Now referring to the drawings for a better understanding of the present invention, and referring first to FIG. 1, there is depicted a thin film capacitor, illustrated generally at 10, having a substrate 12 on which is deposited a thin film 14 of a material serving as a counter electrode. A thin metal film 16 is deposited over the counter electrode 14 and cooperates with the counter electrode to define a bottom electrode of the capacitor structure. Over the bottom electrode 16 is deposited a thin film 18 of dielectric material deposited to a suitable thickness required by the design of the capacitor structure. A second thin metal layer 20 is deposited immediately above the dielectric film 18 and includes a portion 22 that is disposed within a path 24 formed through the dielectric film 18 and being in contact with the upper surface 26 of the first or lower metal film 16. Above the upper metal film 20 may be deposited metal circuit connector elements 28 and 30 which, if desirable may be constructed for connection of the capacitor structure as part of a thin film circuit or, in the alternative, may be subjected to beam lead processing for external attachment of the capacitor structure to a hybrid circuit.

The capacitor structure illustrated in FIG. 1 is a nonpolar low loss thin film capacitor that may be fabricated utilizing deposited tantalum oxide as the dielectric for high capacitance per unit area. The particular materials chosen for the counter electrode film, the substrate, the thin metal films, the dielectric and the circuit connector elements are compatible from the standpoint of the similar coefficients of thermal expansion, thereby preventing overstressing or disruption of any of the thin film layers as the capacitor structure is subjected to the heat of operation or the heat that may be encountered during assembly of the capacitor to other electronic circuits. The dielectric layer is formed by a method other than by anodization of tantalum, thereby allowing selection of the metal for the thin metal film layers to be selected from a wide range of metals that would not function if anodization is employed.

Fabrication of thin film capacitors in accordance with the present invention may be accomplished by first choosing a suitable substrate 12 such as oxidized high $\rho$ silicon or fused silica with an adequate surface finish to allow thin films to be deposited thereon. A film 14 of molybdenum or tungsten may then be deposited by sputtering, evaporation or by chemical vapor deposition onto the prepared surface of the substrate. After the molybdenum or tungsten film has reached a suitable thickness for low equivalent series resistance, it is then patterned by conventional photo-engraving and etching to provide proper capacitor configuration. After this has been done, a thin film 16 of metal may be deposited over the molybdenum or tungsten and may then be patterned by similar photo-engraving and etching. The thin metal film 16 may be selected from a wide range of available and suitable metals, depending upon the particular capacitor characteristics involved. It has been determined that a thin film of chromium, deposited over the molybdenum or tungsten and patterned in similar manner, would be preferred. It may be preferable to pattern the deposited film of chromium or other metal by ion milling or sputter etching as a preferred selective removal technique.

After the metal film has been properly prepared, a thin dielectric film 18 of tantalum oxide may then be deposited to the desired thickness by sputtering or by chemical vapor deposition. The sputtering method of depositing may be accomplished by either reactive sputtering from a tantalum target in an oxygen partial pressure or, in the alternative, may be accomplished by means of radio frequency sputtering from a tantalum oxide ($Ta_2O_5$) target. Practical film thickness of the tantalum oxide may be from 0.2 um(0.6 pf/mil$^2$) to 0.4 um(0.3pf/mil$^2$). After the tantalum oxide film has been deposited to a suitable thickness, it may then be selectively removed in order to provide a path for electrical contact to the bottom electrode. This may be achieved by means of gas plasma vapor etching in a $CF_4$ partial pressure. As an etch stop over the tantalum oxide film, photoresist, aluminum or chromium may be employed and the underlying chromium film will not be attacked by the $CF_4$ although, if molybdenum or tungsten only were disposed beneath the tantalum oxide, these substances would also be removed.

After the film of tantalum oxide has been deposited and properly prepared, the second thin metal film layer 20 may then be suitably deposited. Although it has been determined that other metals may be suitable for formation of the top electrode layer 20, it has been determined that a thin film of chromium, deposited over the dielectric film 18 may be preferred as the metal layer adjacent to the dielectric film because of its hardness, because of its relatively high temperature of recrystallization and because its coefficient of thermal exmpansion is compatible with the coefficient of thermal expansion of the dielectric layer 18 of tantalum oxide.

It may also be desirable to employ aluminum as the top electrode of the capacitor structure. Its principal reliability problem (recrystallization) would be less damaging over the dielectric film than beneath it. Depending upon the desired end product, further processing of the thin film capacitor structure would be conventional. Electroplating of gold may be utilized to form the connector lead portions 28 and 30, which gold may be electroplated in such manner as to form beam lead devices with either conventional separation etch processing or with scribe and break beam lead processing. In the event aluminum connection bumps are chosen for the attachment technique, evaporation of aluminum may be employed to deposit aluminum to a suitable thickness on the layer of dielectric material.

The thin film capacitor structure, yielded by the method of fabrication set forth above, provides thin film constituents that are metallurgically compatible as evidenced by the ability of the completed capacitor structure to withstand an elevated temperature of 450° C. for extended periods of time. Operation of electronic circuits rarely approaches 450° C. and circuit assembly procedures are rarely accomplished at temperatures that approach the recrystallization temperature of any of the constituents of the capacitor structure.

The unique physical properties of the molybdenum/chromium or tungsten/chromium bottom electrodes lend the molybdenum, chromium, tantalum oxide, chromium and gold laminar thin film capacitor structure its very desirable ruggedness and stability. Such stability is enhanced by the high recrystallization temperature (700° C.) of the various thim films and the closeness of the thermal expansion match between the metal, substrate, and dielectric films. The stability of such capacitors is also enhanced by the substantial hardness of the molybdenum film that is employed as the counter electrode. The capacitor structure that is produced by the method of fabrication identified above may have an exceptionally high break down voltage that is typically in the order of $0.7 \times 10^7$ v/cm. Current leakage properties are also exceptional, the leakage current for a 150 pf device being less than $10^{-9}$ amps at 50 volts and the dissipation factor being less than 0.01 percent at 100 KHz.

As identified in FIG. 2, an alternative thin film capacitor structure illustrated generally at 32 may be formed in similar manner as described above in connection with FIG. 1. A substrate 34 composed of oxidized high $\rho$ silicon or fused silica may be provided having a prepared surface 36 of suitable surface finish for thin film processing. A film 38 of molybdenum or tungsten may be deposited onto the surface 36 of the substrate and may then be appropriately patterned to receive a thin metal film 40 composed of chromium or any other suitable metal. The chromium film 40 may also be patterned in suitable manner for further processing. A dielectric film 42 composed of tantalum oxide may then be deposited onto the chromium layer 40 which, together with the tungsten or molybdenum film 38, forms the bottom electrode structure of the capacitor. The tantalum oxide, after having portions thereof selectively removed to define an electric contact path 44, may receive a second metal layer that may be deposited as a thin film thereon. The second or upper metal layer 46 is preferably composed of chromium.

Deposition of an additional dielectric film 48 between the lower chromium electrode film 40 and the dielectric film 42 in the specific area of the electrode crossover provides an optional means of effectively enhancing the dielectric integrity and thus the reliability of the capacitor structure. For example, the additional dielectric film may be composed of silicon dioxide ($SiO_2$) or silicon nitride ($Si_3N_4$) and after being deposited, the additional dielectric film may be patterned so as to leave a strip only where the top electrode crosses over the bottom electrode film.

It may be desirable to employ a barrier film between the upper metal electrode film and the gold connector elements if resistivity stability of the gold is a desirable factor. If such is the case, this can conveniently be accomplished in the manner illustrated in FIG. 3, where a substrate 54 may be provided that is generally identical to the substrate structures illustrated in FIGS. 1 and 2. The capacitor structure may include a counter electrode film 56, a lower thin metal film electrode 58, a dielectric layer 60 and upper thin metal film 62, all of which may be deposited in the manner described above in connection with FIGS. 1 and 2.

To provide for optimum resistivity stabiltiy of the gold connector layers 66 and 68, an intermediate layer 64 may be deposited onto the upper surface of the upper metal film 62. The intermediate layer may be composed of molybdenum, tungsten or an alloy of titanium and tungsten. The gold connector elements 66 and 68 may be deposited and electroplated onto the intermediate layer in the same manner as discussed above in connection with FIGS. 1 and 2.

Although the technology set forth herein has been described particularly in its connection with fabrication of thin film capacitor structures, it should also be borne in mind that similar technology may be effectively applied to gate insulation of MOS integrated circuits and may be utilized to fabricate thin film capacitors on bipolar integrated circuits.

By elimination of the anodized tantalum oxide and aluminum underlay concept of typical thin film capacitor structures and by employment of materials of high recrystallization temperature and closeness of thermal expansion match between metal substrate and dielectric layers an exceptionally durable capacitor structure has been provided. The exceptionally durable and reliable nature of the present thin film capacitor structure is also enhanced through employment of exceptionally hard materials, such as the molybdenum and tungsten films. The unique physical properties of the molybdenum-chromium or tungsten-chromium bottom electrodes of such capacitors promote exceptional durability of the capacitor structure without sacrificing conductivity. The high recrystallizaton temperature of the various films effectively prevent great changes in electrode topology that might otherwise be caused if the temperature of recrystallization is reached or exceeded. Moreover, the metallurgically compatible films yield a thin film capacitor structure that effectively prevents heat overstressing of the dielectric film that would otherwise cause excessive leakage currents or shorts to appear. Thin film capacitors constructed in accordance with the present invention will withstand temperatures of 450° C. for extended periods of time.

It is apparent that the present invention is one well adapted to attain all of the objects and advantages hereinabove set forth, together with other advantages that will become obvious and inherent from a description of the method and apparatus itself. It will be understood that certain combinations and subcombinations are of utility and may be employed without reference to other features and subcombinations. As many possible embodiments may be made of the present invention without departing from the spirit or scope thereof, it is to be understood that all matters herein set forth or shown in the accompanying drawings are to be interpreted as illustrative and not in a limiting sense.

What is claimed is:

1. A method of fabricating a thin film capacitor for use as a component of a thin film circuit or for use in beam lead assembly as part of a hybrid circuit, said method comprising the steps of:
   a. providing a capacitor substrate;
   b. depositing on said substrate a thin film counter electrode;
   c. patterning said thin film counter electrode;
   d. depositing a first thin metallic film over said patterned counter electrode;
   e. patterning said first thin metallic film;
   f. depositing a dielectric film over said patterned metallic film;
   g. selectively removing a portion of the dielectric film to provide a path for electrical contact to the bottom electrode; and
   h. depositing a second thin metallic film over the dielectric film thereby establishing contact to the bottom electrode, the coefficient of expansion of said thin metallic films and said dielectric film being sufficiently close to prevent overstressing of said dielectric film as said capacitor is heated and cooled, and patterning said second thin metallic film to provide first and second terminals for said capacitor.

2. A method of fabricating a thin film capacitor as recited in claim 1, wherein said dielectric film is tantalum oxide deposited by sputtering.

3. A method of fabricating a thin film capacitor as recited in claim 2, wherein said thin metallic films are deposited by sputtering.

4. A method of fabricating a thin film capacitor as recited in claim 2, wherein said thin metallic films are composed of chromium.

5. A method of fabricating a thin film capacitor as recited in claim 1, wherein:
   a. said counter electrode is composed of molybdenum;
   b. said thin metallic films are composed of chromium; and
   c. said dielectric film is composed of tantalum oxide and is deposited by sputtering.

6. A method of fabricating a thin film capacitor as recited in claim 5, wherein said tantalum oxide is selectively removed by plasma vapor etching in a $CF_4$ partial pressure environment.

7. A method of fabricating a thin film capacitor as recited in claim 5, wherein:
   a. said tantalum oxide is selectively removed by plasma vapor etching in an environment $CF_4$ partial pressure; and
   b. chromium is employed as an etch stop over and/or under the tantalum oxide.

8. A method of fabricating a thin film capacitor as recited in clain 1, including the additional method step of:
   a. depositing an additional dielectric film of $SiO_2$ immediately following patterning of said first metallic film; and
   b. patterning said additional dielectric film by leaving a strip only where said second metal film crosses over said first metal film.

9. A method of fabricating a thin film capacitor as recited in claim 1, including the additional method step of depositing gold on the second metallic film to form beam lead circuit connections.

10. A method of fabricating a thin film capacitor for use as a component of a thin film circuit or for use in beam lead assembly as part of a hybrid circuit, said method comprising the steps of:
    a. providing a capacitor substrate having a first thin film pattern of a metal selected from molybdenum and tungsten thereon;
    b. depositing a first thin film of chromium on said first thin film pattern;
    c. depositing a thin film of tantalum oxide onto said first chromium thin film;
    d. selectively removing portions of the thin film of tantalum oxide to provide a path through said tantalum oxide for establishing electrical contact to said first chromium thin film;
    e. depositing a second thin film of chromium over said thin film of tantalum oxide, said second chromium thin film contacting said first chromium thin film through said path; and
    f. depositing and patterning metallic connection leads over said second chromium thin film;
    g. said first and second chromium thin films and said thin film of tantalum oxide having substantially matched coefficients of thermal expansion and said chromium films having high temperature of recrystallization.

11. A method of fabricating a thin film capacitor as recited in claim 10, wherein:
    a. said thin film of tantalum oxide is deposited by sputtering;
    b. said thin films of chromium are deposited by chemical vapor deposition; and
    c. said metallic connection leads are composed of gold deposited by electroplating.

12. A method of fabricating a thin film capacitor as recited in claim 10, wherein said metallic connection leads are formed of gold, said gold being deposited by a combination of vapor deposition and electroplating.

13. A method of fabricating a thin film capacitor as recited in claim 10, wherein said metallic connection leads are formed of gold, said gold being deposited by beam lead processing.

14. A metho of fabricating thin film capacitor as recited in claim 10, wherein said metallic connection leads are formed of aluminum, said aluminum being deposited by vapor deposition.

15. A method of fabricating a thin film capacitor as recited in claim 10, including the method steps of depositing a thin film of molybdenum over said second thin chromium film prior to depositing of said metallic connection leads, said metallic connection leads being deposited onto said thin film of molybdenum.

16. A method of fabricating a thin film capacitor as recited in claim 10, including the method step of depositing a thin film of tungsten over said second chromium thin film prior to depositing of said metallic connection leads, said metallic connection leads being deposited onto said thin film of molybdenum.

17. A method of fabricating a thin film capacitor as recited in claim 10, including the method step of depositing a thin film of titanium tungsten alloy over said second chromium thin film prior to deposition of said metallic connection leads, said metallic connection leads being deposited onto said thin film of molybdenum.

18. A method of fabricating a thin film capacitor as recited in claim 10, including the method step of:
   a. depositing an additional dielectric film of $SiO_2$ onto said first film of metal before deposition of said tantalum oxide; and
   b. patterning said additional dielectric film to leave a strip thereof only where said second chromium film crosses said first metal film.

19. A method of fabricating a thin film capacitor as recited in claim 10, including the method step of:
   a. depositing an additional dielectric film of $Si_3N_4$ onto said first film of chromium befoe deposition of said tantalum oxide; and
   b. patterning said additional dielectric film to leave a strip thereof only where said second chromium film crosses over said first chromium film.

* * * * *